Dec. 17, 1963    A. L. HERRMANN    3,114,587
FLAT CABLES AND CORRESPONDING CONNECTOR
Filed Oct. 2, 1961    3 Sheets-Sheet 1
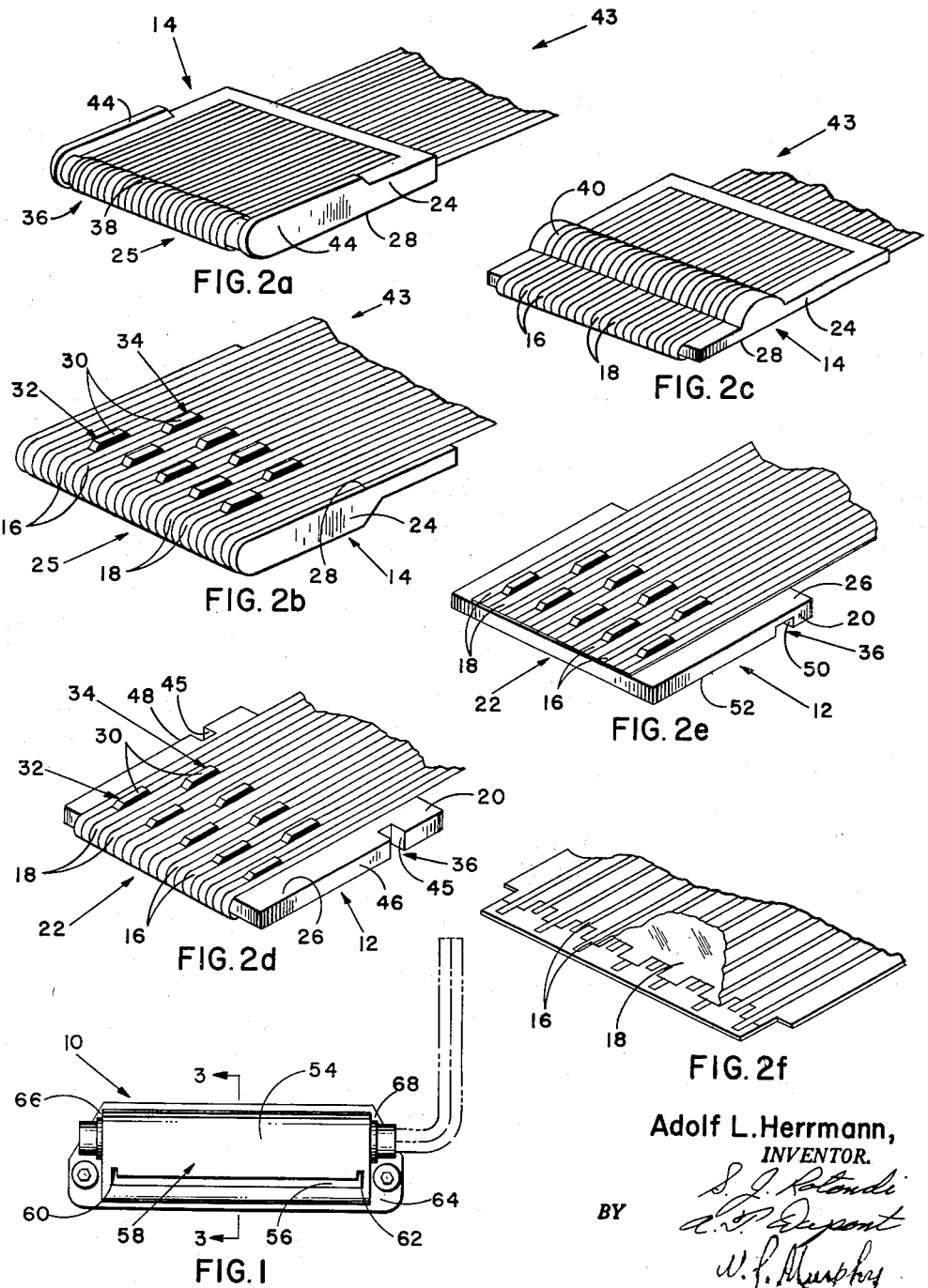
Adolf L. Herrmann,
INVENTOR.

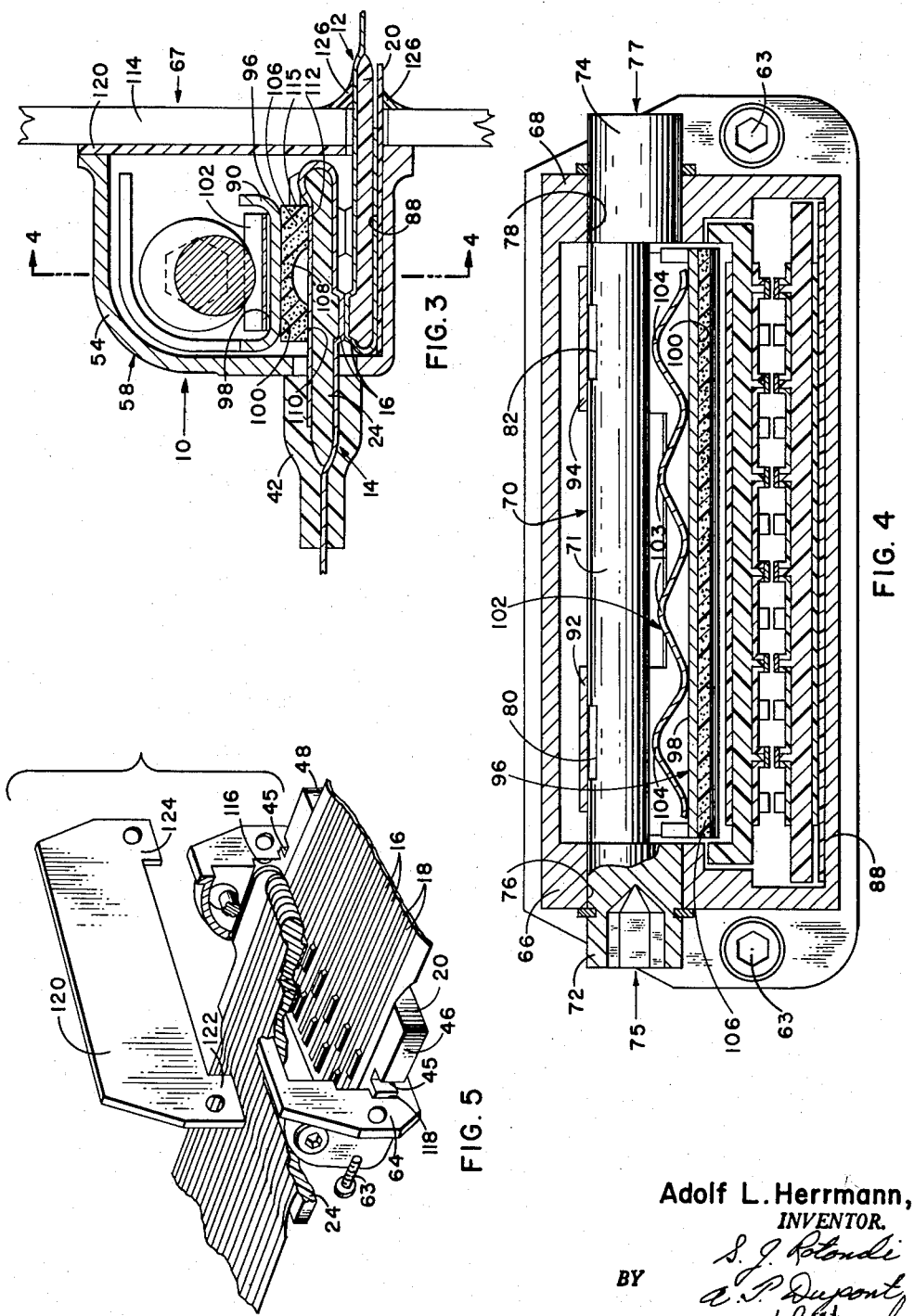

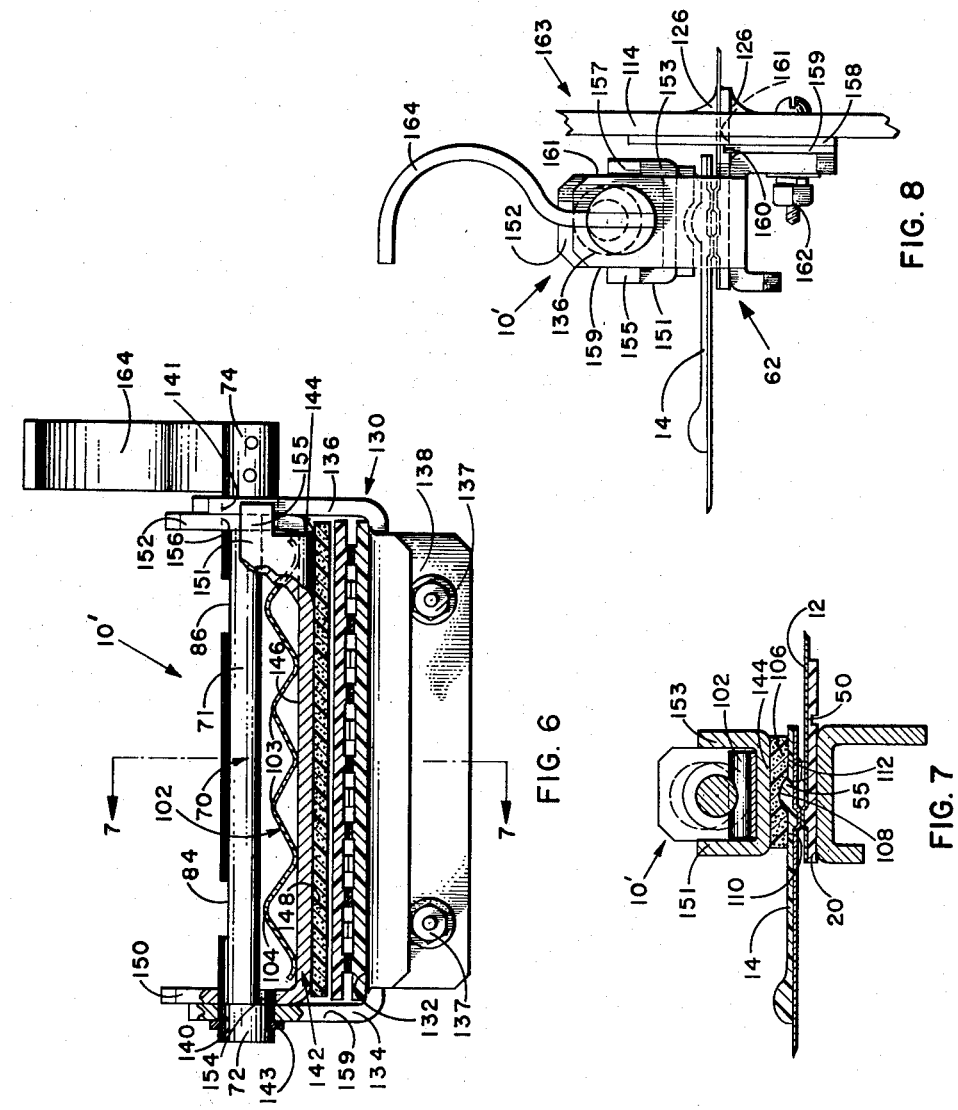

United States Patent Office 3,114,587
Patented Dec. 17, 1963

1

3,114,587
FLAT CABLES AND CORRESPONDING
CONNECTOR
Adolf L. Herrmann, 710 Watts Drive SE.,
Huntsville, Ala.
Filed Oct. 2, 1961, Ser. No. 142,447
8 Claims. (Cl. 339—75)
(Granted under Title 35, U.S. Code (1952), sec. 266)

The invention described herein may be manufactured and used by or for the Government for governmental purposes without the payment of any royalty thereon.

The present invention relates to cables which for the purpose of saving weight and space, are in the form of a thin, substantially flat sheet or strip of nonconductive base material having a series of electrically conductive elements attached to or made an integral part of the base material. The invention relates particularly to a connecting device especially adapted to secure a pair of flat cables therein.

The invention as described herein is an improvement over the flat cables and connector as disclosed in my U.S. Patent Number 2,952,002, wherein a spring is constantly exerting a pressure on a pressure block. However, it has been found that the pressure exerted by the spring on the block shows a tendency to be non-uniform in that the spring makes contact with the block on a relatively small area thereof. In the flat cable of my above mentioned patent it has also been noted that the cables themselves are not provided with positive means to assure that they remain as originally positioned when placed in the connector.

According to the present invention, each of the cables is provided with a plurality of conducting strips and insulation therebetween and are disposed in the connector in overlapping face-to-face positions having their respective conductors in mating contact. The adjacent ends of each of the cables are provided with reinforcement or stiffeners having raised portions corresponding to the point of contact therewith of the conductors of the cables and the conductors are bared at the raised portions. The connector serves to join the cables in the overlapping face-to-face position and includes clamping means for exerting uniform pressure across the corresponding contacting raised portions of the cables to assure electrical continuity therebetween.

It is therefore, an object of the present invention to provide a pair of flat cables having stiffeners provided at the adjacent ends of each cable and including raised portions corresponding to conducting strips of the cables.

A further object of the present invention is to provide a connector which will exert uniform pressure across the raised portions of the cables and the corresponding conducting strips in contact therewith to assure electrical continuity between the conductors of the respective cables when the cables are positioned in the connector.

A still further object of the present invention is to provide flat cables which allow for alignment of the connected cables.

Another object is to provide a cable stiffener which assures locking the cables in position in the connector.

Hereinafter reference will be made to an internal and external cable. The internal cable is the cable normally extending from the equipment box into the rear of the connector. The external cable is the plug-in cable, or the cable last to be inserted into the connector to complete the electrical connection.

Further objects, features and advantages will become apparent from the following description and claims taken in conjunction with the following drawings, in which:

FIGURE 1 is an elevational view of the connector.

FIGURES 2a through 2e are partial perspective views illustrating various embodiments of the flat cable and stiffeners and, specifically, FIGURE 2a illustrates an external flat cable provided with a stiffener having raised shoulders on the sides thereof for guiding the flat cable into the connector.

FIGURE 2b is a view of the face of the flat cable shown in FIGURE 2a, but showing the raised staggered arrangement of the conducting strips.

FIGURE 2c is a view of a flat cable provided with a stiffener having a raised portion extending across the width thereof for securing the cable in the connector.

FIGURE 2d is a view of an internal flat cable provided with a stiffener having raised staggered portions and including slots on the sides thereof for locking the cable in the connector.

FIGURE 2e is a view similar to FIGURE 2d showing the locking means on the stiffener in the form of a slot extending across the width of the stiffener and on the underside thereof.

FIGURE 2f is a view of a printed circuit board showing the conductors in staggered relation.

FIGURE 3 is an enlarged sectional view taken along the plane indicated by line 3—3 of FIGURE 1, showing the connector in its closed position.

FIGURE 4 is a sectional view along line 4—4 of FIGURE 3 and shows the connector in open position.

FIGURE 5 is an exploded perspective rear view of the connector and the associated cables.

FIGURE 6 is a sectional view similar to FIGURE 4 on a somewhat smaller scale, having portions thereof broken away illustrating an alternate form of the present invention.

FIGURE 7 is a sectional view along line 7—7 of FIGURE 6.

FIGURE 8 is an end elevational view showing the connector secured to an equipment box wall.

The present invention as shown in FIGURES 1 through 5 illustrates a connector 10 for connecting a pair of flat cables 12 and 14 (FIGURES 3 and 6) respectively, together in overlapping face-to-face position. Each of the cables is provided with conducting strips 16 and insulation 18 therebetween. The first or internal cable 12 is provided with a rigid non-elastic stiffener 20 on the end 22 thereof (FIGURES 2d and 2e), to be positioned in the connector 10. Cable 14, the external or plug-in cable, is provided with an elastic stiffener 24 at the end 25 thereof (FIGURES 2a, 2b and 2c). Construction of the cables as described above has been provided to eliminate any deformation which might occur when contact pressure is applied. Another advantage derived from the above described construction is that, because of the rigidity of the stiffener 20, this construction offers the capability of being replaceable by a printed circuit board terminal plate.

FIGURES 2a through 2e illustrate various forms of the flat tape cables and stiffeners. Each of the preformed stiffeners 20 and 24 is provided along one side with a face 26 and 28, respectively. The faces 26 and 28 are each provided with raised portions 30 preferably, but not necessarily, arranged in staggered relation in two rows 32 and 34 extending across the width of the stiffeners and over which raised portions, the conducting strips run so as to be elevated above the face of the respective stiffeners.

Each of the flat cables 12 and 14 may be secured to their respective stiffeners 20 and 24 by wrapping the cable around the stiffener so that the conducting strips are in mating contact with the raised portions 30 to assure that the conducting strips project above the faces 26 and 28 of respective stiffeners 20 and 24. The conducting strips are bared at the raised portions 30 to provide an electric contact between the cables when they are placed in the connector 10 as will presently appear. To attach the cable to the stiffener it is only necessary to apply a bonding material to the face of the stiffener, place the stiffener and cable into a press which is provided with a resilient pad which depresses the insulation into the grooves between the ridges of the stiffener, thereby leaving the conductors raised above the face of the stiffener.

The cables are provided with insulation 18 which completely covers the spaced conductors 16 and since the stiffeners have raised portions 30 thereon at the spots where the contacts will be it is necessary to remove the insulation 18 at these raised portions. This may be done by grinding with a cable stripper which has a rotating fiberglass or hot metal drum. The exposed contacts can then be gold plated or plated with some other corrosion resistant metal. Maximum safety from arcing is attained by arranging the conductor's contact points like windows in the cables and removing the insulation from these points only. The cable may be wrapped around the stiffener and glued thereto to avoid exposing the cable ends.

Each of the stiffeners 20 and 24 of cables 12 and 14, respectively, are provided with locking means 36 to assure that the cables are secured against accidental displacement when positioned in the connector 10.

The locking means associated with stiffener 24 of external cable 14 is in the form of a ridge extending across the width of the stiffener 24. In the form of cable 14 shown in FIGURE 2a, the ridge 38 is located at the forward end 25 of the stiffener.

As shown in FIGURE 2c another type of locking means is illustrated and is in the form of a ridge 40 intermediate the ends of stiffener 24 and extending across the width thereof.

As further illustrated in FIGURES 2a and 2b the stiffener 24 is provided with shoulders 44 on the sides thereof to guide the cable 14 in position in the connector 10.

The locking means 36 on stiffener 20 of cable 12 is illustrated in FIGURES 2d and 2e and may be either in the form of a slot on each edge of the stiffener 20, or in the form of a groove extending across the width thereof.

The locking means 36 as illustrated in FIGURE 2d is a slot 45 disposed on each of the sides 46 and 48 of stiffener 20.

The locking means 36 as illustrated in FIGURE 2e is in the form of a groove 50 extending across the width and on the underside 52 of stiffener 20.

The locking means of both the internal cable 12 and the external cable 14 as described above coact with the connector 10 to secure the cables therein in a manner which will presently appear.

The connector 10 (FIGURE 1) is provided with a housing 54 having an elongated slot 56 in the front 58 thereof to serve as a guide for the insertion of cable 14 into the connector 10. The slot 56 includes a pair of vertically extending cut-out portions 60 and 62, respectively, at the extreme ends of slot 60.

To prevent dust or other foreign matter from entering the connector 10 there is provided a dust shield 42 disposed to cover slot 56. The shield 42 (FIGURE 3) is positioned on the cable 14 at the point where it extends into connector 10.

The housing 54 further includes a mounting plate 64 at the back 67 thereof and a pair of upstanding end plates 66 and 68. Each of the end plates 66 and 68 are disposed adjacent opposite ends of mounting plate 64 and in normal relation thereto.

A shaft 70 (FIGURE 4) carried by end plates 66 and 68 includes an offset portion 71 intermediate a pair of eccentric shoulders 72 and 74 at the ends 75 and 77, respectively of shaft 70. Shoulders 72 and 74 are in axial alignment along a longitudinal axis and are journalled in respective openings 76 and 78 extending transversely through end plates 66 and 68, respectively, of housing 54.

The shaft 70 is further provided with a pair of flat surfaces 80 and 82 on offset portion 71 adjacent the ends 75 and 77, respectively. To provide a means for mounting cables 12 and 14 in connector 10 as shown in FIGURES 3 and 4, a cable mounting base 88, integral with housing 54, is disposed beneath shaft 70 and between end plates 66 and 68.

A pressure plate 90 is secured around shaft 70 at the intermediate portion 71 thereof by means a pair of arms 92 and 94. Arms 92 and 94 extend around portion 71 and in contact therewith. The pressure plate 90 further includes a base portion 96 disposed between the shaft 70 and cable mounting base 88. The pressure plate base portion 96 is provided with upper and lower surfaces 98 and 100, respectively. A corrugated spring 102 disposed on the upper surface 98 of pressure plate 90 extends longitudinally therealong and beneath the shaft 70.

The corrugated spring 102 is provided with raised portions 103 and a pair of higher raised portions 104 at the ends thereof disposed adjacent the flat surfaces 80 and 82 of shaft 70.

The lower surface 100 of pressure plate 90 is provided with a rubber pressure pad 106 secured thereto by any suitable means, such as adhesive. The pad 106 includes an indented portion or recess 108 extending longitudinally therealong and opening through the bottom thereof. The flat surfaces 110 and 112 of the bottom of the pad on opposite sides of the recess indented portion 108 are disposed to exert uniform pressure across the raised portions of the cables 12 and 14 when the cables are inserted in the connector and clamped therein.

As shown in FIGURE 3 the connector 10 is mounted on an equipment box wall 114. Counterclockwise rotation of shaft 70, by any suitable means such as an Allen wrench as illustrated in FIGURE 1, rotates the enlarged eccentric shoulders 72 and 74 in the respective openings 76 and 78 of end plates 66 and 68, thus causing the portion 71 of shaft 70 intermediate the shoulders 72 and 74 to be lifted through an arcuate path to a position above the longitudinal axis of the enlarged eccentric shoulders 76 and 78. As the intermediate portion 71 of shaft 70 is rotated to its upward position, the arms 92 and 94 which extend around and in contact with the portion 71 of shaft 70 are caused to be pulled upward and carries the pressure plate 90 therewith to open the connector 10.

Cable 12, shown in FIGURE 3 as projecting from equipment box 114, is inserted into the connector through the rear portion 67 of housing 54. The housing 54 is provided with grooves 116 and 118 (FIGURE 5) which protrude into the rear portion 67. Groove 118 serves as a guide to insert the internal cable 12 in position and groove 116 serves as a guide for inserting external cable 14 in connector 10.

In operation, cable 12 is inserted through the rear 67 of the housing 54 and into groove 118 provided in connector 10. A backplate 120 (FIGURE 5) is secured to the rear 67 of connector 10 by means of screws 63 at the same time housing 64 is secured to wall 114. The backplate 120 is provided with depending tabs 122 and 124 which fit into the slots 45 (FIGURE 2d) on the sides 46 and 48 of stiffener 20 to lock cable 12 in position in connector 10.

Once the internal cable 12 is positioned in connector 10 and the connector 10 is secured to equipment box wall 114 by means of screws 63 extending through mounting plate 64 and into wall 114, then the cable 12 may be potted with an epoxy 126 at the point where cable 12 extends through the equipment box wall 114 to effect an airtight, dustproof seal.

Cable 14 is then inserted through slot 56 (FIGURE 1) in the front 58 of housing 54. The vertically extending cut-out portions 60 and 62 of slot 56 are disposed to receive the shoulders 44 (FIGURE 2a) of stiffener 24 therein to guide cable 14 into position in the connector 10. Upon insertion of the cable 14 in the connector 10, the raised ridge 38 at the forward end 25 of stiffener 24 rests against an inner edge 115 of pressure pad 106 to provide a means of securing the cable 14 in position when the connector 10 is closed (FIGURE 3).

To clamp the cables 12 and 14 in overlapping face to face position in the connector 10, the shaft 70 is rotated clockwise turning the enlarged eccentric shoulders 72 and 74 in the respective openings 76 and 78 of end plates 66 and 68, thus turning the intermediate portion 71 of shaft 70 downward through an arcuate path and into engagement with peaks 104 of corrugated spring 102 thereby depressing peaks 104 and expanding spring 102 across pressure plate 90 to exert a uniform downward pressure thereon. Thus, pressure plate 90 is forced downward and carries pressure pad 106 therewith to clamp the cables 12 and 14 between the pressure pad 106 and mounting base 88 in the overlapping face to face position, wherein the raised bared conducting strips 16, respectively, of cables 12 and 14 are in contact to permit an electric potential to pass from one cable to the other and through connector 10.

A slight additional rotation of shaft 70 causes engagement of the flat surfaces 80 and 82 thereof with peaks 104 of spring 102 to lock the shaft 70 in closed position.

While the connector of the present invention has been described in conjunction with flat cables, it is to be understood that the use of the connector is not limited to flat cables only but may be extended to include printed circuit boards. A printed board (FIGURE 2f) may be inserted into connector 10 in lieu of cable 12. The board may be secured in the connector 10 by having slots cut into the sides thereof and fitting tabs 122 of backplate 120 into the slots.

As shown in FIGURE 2f a printed board is provided with conductors having their ends staggered. To produce this pattern a comb like shield is placed over the printed board so that the shield covers part of the conductors. An insulating lacquer or epoxy is sprayed on the board and when the shield is removed the conductors are insulated to different lengths. This method produces the same staggered contact pattern on the printed board as is attained on the printed cable and stiffener which it replaces.

In an alternate form of the connector 10', as illustrated in FIGURES 6 through 8, the housing and pressure plate have been slightly modified to permit a vertical movement of the pressure plate in the clamping action of the connector 10. Locking of the cables 12 and 14 in the connector 10 is accomplished in a somewhat different manner than as previously described.

The same numerals will be used in the description of this alternate form of the connector 10 to indicate the same parts as described in the first embodiment.

As shown in FIGURE 6, the connector 10' is provided with a housing 130, which is made as a one piece, integral unit and comprises a pair of upstanding end plates 134 and 136 at opposite ends of a cable mounting base 132 which extends horizontally between end plates 134 and 136 and provides a means for mounting cables 12 and 14 in the connector 10', as will presently appear.

To provide a means for attaching connector 10' to a wall, the housing 130 is provided with a mounting plate 138 which depends from mounting base 132 and is provided with openings 139 to receive screws 137 therethrough for the wall attachment.

To serve as a means to mount shaft 70 in connector 10', the end plates 134 and 136 are provided with a pair of axially aligned holes 140 and 141, respectively, and the enlarged eccentric shoulders 72 and 74 of shaft 70 are journalled in holes 140 and 141, respectively. The shaft may be secured in the connector 10' by means of a snap ring 143 disposed on shaft 70 adjacent end plate 134.

A pressure plate 142 disposed for vertical movement is mounted between end plates 134 and 136 and is provided with a base portion 144 horizontally extending intermediate a pair of end plates 150 and 152. Base portion 144 includes upper and lower surfaces 146 and 148, respectively, and end plates 150 and 152 are provided with holes 154 and 156, respectively.

Pressure plate 142 is mounted between end plates 134 and 136 of housing 130 so that its end plate 150 is adjacent the end plate 134 of housing 130 and hole 154 of plate 150 is adjacent hole 140 of plate 134 and in somewhat offset registry. The other end plate 152 of pressure plate 142 is disposed adjacent the end plate 136 of housing 130, and the hole 156 of plate 152 is adjacent hole 141 of plate 136 and in somewhat offset registry.

The shaft 70 extends through holes 154 and 156 of end plates 150 and 152, respectively, so that the enlarged eccentric shoulders 72 and 74 of shaft 70 are journalled in holes 140 and 141 of end plates 134 and 136, respectively.

The pressure plate 142 is further provided with a pair of upstanding sides 151 and 153 which extend upwardly in parallel relation and on opposite sides of base portion 144. The corrugated spring 102 is mounted on the upper surface 146 of base portion 144 to be retained in position by sides 151 and 153.

Each of the sides 151 and 153 of pressure plate 142 is provided with tabs 155 and 157 which extend longitudinally from opposite ends of each of the sides to overlap the edges 159 and 161 of end plates 134 and 136, respectively. The lower surface 148 of pressure plate 142 is provided with the indented pressure pad 106 to exert uniform pressure across the cables 12 and 14 when they are inserted and clamped in the connector 10'.

Connector 10' is mounted on equipment box wall 114 (FIGURE 8) as previously described and the internal cable 12 is inserted into connector 10' and onto mounting base 132 through the rear portion 163 of connector 10'.

To lock cable 12 into connector 10', subsequent to insertion of the cable into the connector, a backplate 158 is provided to be secured to the rear portion 163 of connector 10' by means of screws 162. The backplate 158 is provided with a horizontal slot or opening 161 extending longitudinally thereacross. A second plate 159 including an upstanding tab 160 is disposed adjacent to backplate 158 in a manner so that the tab 160 is made to partially overlap opening 161. Subsequent to insertion of internal cable 12 into connector 10' through opening 161 of backplate 158 the tab 160 is fitted into groove 50 of stiffener 20 and both backplates 158 and 159 are secured to housing 130 by means of screws 162.

The external cable 14 is inserted into the front 165 of connector 10' and shaft 70 is rotated by any suitable means, such as handle 164, to clamp cable 14 in connector 10'. The raised ridge 40 of stiffener 24 (FIGURE 2c) fits into the indented portion 108 of pressure pad 106 to hold the cable 14 as positioned (FIGURE 7).

To clamp cables 12 and 14 in connector 10' the shaft 70 is rotated so that the offset portion 71 thereof is moved downward through an arcuate path and into engagement with peaks 104 of spring 102. The shaft 70 is further rotated until the portion 71 depresses peaks 104 of spring 102 thus forcing pressure plate 142 downward. Plate 142 is guided vertically downward by virtue of tabs 155 and 157 sliding on edges 159 and 161 of end plates 134 and 136, respectively.

The downward movement of pressure plate 142 forces the flat surfaces 110 and 112 of pressure plate 106 into engagement with cable 14 for exerting uniform pressure across the cables.

A slight additional rotation of shaft 70 causes the flat surfaces 80 and 82 thereof to engage the peaks 104 of spring 102 to effect a locking of the shaft 70 in the closed position.

As previously mentioned, the cable 12 may be potted with an epoxy 126 at the point where the cable 12 extends through equipment box wall 114, to effect an airproof and dustproof seal.

FIGURE 2f illustrates another form of the cables which may be used with connectors 10 and 10' and has insulation enclosing the conductors 16. The conductors 16 may be staggered as shown and bared at the tips thereof. The cable may be mounted on the stiffener to have the bared portions raised by the raised portions of the stiffeners.

It is to be understood that with slight modifications, any of the cables or printed circuit board as illustrated in FIGURES 2a through 2f may be used interchangeably with either embodiment of the connector 10 or 10'.

While the foregoing is a description of the preferred embodiments of the present invention, it is to be understood that various modifications thereof may be resorted to that are within the spirit and scope of the appended claims.

I claim:

1. A connector and a pair of flat cables to be joined in said connector in overlapping face to face position, each of said cables provided with a plurality of spaced conducting strips and insulation therebetween, stiffeners disposed at adjacent ends of said cables, said stiffeners provided with faces having raised portions thereon, and spacedly corresponding to said conducting strips above said faces in mating relation, locking means provided on said connector and said cables and disposed for interconnection therebetween for retention of said cables in said connector, said connector comprising a housing including a pair of upstanding end plates, each of said end plates disposed adjacent opposite ends of said connector and provided with a hole therein, a substantially horizontal cable mounting base extending between said end plates, an eccentric shaft rotatably supported in said holes of said end plates, a pressure plate including upper and lower surfaces carried by said shaft between said mounting base and said shaft, a resilient pressure pad disposed on said lower surface of said pressure plate, a corrugated spring carried on said upper surface of said pressure plate and horizontally extending beneath said shaft, said shaft disposed for a downward movement responsive to rotation thereof and into engagement with said spring to move said pressure plate downward to clamp said cables with their respective conductors in contact between said pressure pad and said cable mounting base.

2. The connector as in claim 1 wherein said shaft is provided with enlarged eccentric shoulders on the ends thereof, said shoulders being in alignment along a longitudinal axis, an offset shaft portion disposed between said shoulders and provided with a pair of flat surfaces disposed on opposite ends of said offset portion of said shaft.

3. The flat cables as in claim 1 wherein said raised portions are alternately staggered in two lines across the width of said stiffener.

4. The connector and flat cables as set forth in claim 1 wherein said pressure pad is provided with an indented portion substantially centered thereacross and a pair of flat shoulders adjacent the indented portion, said shoulders disposed to exert equal pressure across said raised portions of said cables when said connector is in the closed position.

5. The flat cables and connector as set forth in claim 1 wherein said housing is provided with forward and rearward portions, said forward portion having a horizontally extending slot therein, said slot communicating into vertically extending openings at the ends thereof; and one of said cables is provided with a stiffener provided with raised shoulders on the sides thereof in substantially parallel relation, said shoulders disposed for insertion into said vertically extending openings of said slot to guide said cable through said horizontally extending slot and into said connector.

6. The flat cables and connector as set forth in claim 1 wherein said locking means includes a backplate disposed for attachment to said connector and provided with tabs depending from opposite ends thereof, and said cable is provided with a slot on opposite sides thereof, said tabs disposed for insertion into said slots of said cable prior to attachment of said backplate to said connector.

7. The flat cables and connector as set forth in claim 1 wherein said locking means includes a backplate disposed for attachment to said connector and provided with a horizontally extending slot therein, a second plate disposed for attachment to said first plate and provided with an upstanding tab, and said stiffener of one of said cables is disposed for insertion into said slot and is provided with a groove extending across the width and on the underside thereof, said tab of said second plate disposed for insertion into said groove of said stiffener subsequent to the insertion and prior to attachment of said plates to said connector.

8. The connector as set forth in claim 1 wherein said housing is provided with a mounting plate depending therefrom, said pressure plate provided with upstanding sides to enclose said corrugated spring, each of said sides provided with longitudinally extending tabs projecting from the ends thereof and overlapping said end plates of said housing to guide said pressure plate vertically downward responsive to rotation of said shaft.

References Cited in the file of this patent

UNITED STATES PATENTS

| 2,952,002 | Angele et al. | Sept. 6, 1960 |
| 2,965,811 | Batcher | Dec. 20, 1960 |
| 2,968,016 | Angele | Jan. 10, 1961 |
| 3,017,602 | Little | Jan. 16, 1962 |